United States Patent [19]

Stach

[11] Patent Number: 5,575,539
[45] Date of Patent: Nov. 19, 1996

[54] WHEEL RIM FOR A MOTOR VEHICLE AND PROCESS FOR MAKING SAME

[75] Inventor: Jens Stach, Weil der Stadt, Germany

[73] Assignee: Dr. Ing. h.c.F. Porsche AG, Weissach, Germany

[21] Appl. No.: 463,008

[22] Filed: Jun. 5, 1995

Related U.S. Application Data

[63] Continuation-in-part of Ser. No. 262,100, Jun. 16, 1994, Pat. No. 5,538,329, which is a continuation of Ser. No. 8,582, Jan. 25, 1993, abandoned, which is a continuation-in-part of Ser. No. 979,274, Nov. 20, 1992, abandoned.

[30] Foreign Application Priority Data

Nov. 23, 1991 [DE] Germany .................... 41 38 558.6
Jan. 24, 1992 [DE] Germany .................... 42 01 838.2
Aug. 27, 1994 [DE] Germany .................... 44 30 489.7

[51] Int. Cl.⁶ .................................................. B60B 5/00
[52] U.S. Cl. ......................................... 301/65; 301/104
[58] Field of Search ........................... 301/64.1, 65, 66, 301/67, 72, 73, 104, 64.2; 29/894.342

[56] References Cited

U.S. PATENT DOCUMENTS

| | | |
|---|---|---|
| 1,393,796 | 10/1921 | Lachman . |
| 1,393,928 | 10/1921 | Walther et al. .............. 301/65 |
| 1,433,764 | 10/1922 | Waterbor et al. ............ 301/65 |
| 1,566,344 | 12/1925 | Perrot et al. ................ 301/65 |
| 1,602,512 | 10/1926 | Walther et al. . |
| 1,610,023 | 12/1926 | Meldrum ................... 301/65 |
| 1,626,211 | 4/1927 | Reed ........................ 301/65 |
| 1,635,490 | 7/1927 | Meldrum . |
| 1,850,345 | 3/1932 | Esksergian . |
| 1,952,474 | 3/1934 | Tarbox . |
| 3,253,862 | 5/1966 | Watanabe et al. .......... 301/65 |
| 3,862,779 | 1/1975 | Jayne . |

FOREIGN PATENT DOCUMENTS

| | | |
|---|---|---|
| 0004679 | 10/1979 | European Pat. Off. . |
| 447695 | 1/1913 | France . |
| 2347124 | 4/1977 | France . |
| 132949 | 1/1902 | Germany . |
| 2134485 | 2/1972 | Germany . |
| 2855308 | 7/1979 | Germany . |
| 4014368 | 3/1991 | Germany . |
| 29460 | 7/1911 | United Kingdom . |
| 1351611 | 5/1974 | United Kingdom . |

OTHER PUBLICATIONS

Patent Abstracts of Japan, vol. 01, No. 7177 (M–1993), Apr. 6, 1993 & JP-A-04 334 601 (Mazda Motor Co.).

Primary Examiner—Russell D. Stormer
Attorney, Agent, or Firm—Evenson, McKeown, Edwards & Lenahan, P.L.L.C.

[57] ABSTRACT

A wheel consists of a cast wheel spider which comprises several hollow spokes and which is connected with a rim ring by way of a weld, particularly a friction weld. In the area of the outer circumference, the hollow spokes have internal core openings for a sand core, and the openings are directed toward the rim ring. The wheel spider has bolt bores which are arranged concentrically with resect to a centric wheel opening and which are provided with bore sleeves which are cast approximately in the center inside the hollow spoke and have radially extending reinforcing ribs 11. In the area of the core openings, the wheel spider has at least one reinforcing element between opposite walls of each hollow spoke. The reinforcing element preferably consists of two cylindrically cast pins respectively which extend in parallel to the wheel axis and are arranged at a distance from one another and are situated on both sides of a transverse wheel plane defined by the reinforcing rib.

20 Claims, 1 Drawing Sheet

WHEEL RIM FOR A MOTOR VEHICLE AND PROCESS FOR MAKING SAME

BACKGROUND AND SUMMARY OF THE INVENTION

This application is a continuation-in-part application of application Ser. No. 08/262,100, filed Jun. 16, 1994, now U.S. Pat. No. 5,538,329 which is a continuation application of application Ser. No. 08/008,582 filed Jan. 25, 1993, now abandoned, which is a continuation-in-part application of application Ser. No. 07/979,274, filed Nov. 20, 1992, now abandoned.

This invention relates to a wheel having a cast wheel spider comprising several hollow spokes connected with a rim ring by way of a friction weld, the hollow spokes having core openings for a sand core in the area of the outer circumference which are directed toward the rim ring.

In the above-mentioned application Ser. No. 07/979,274 and corresponding German Patent Document DE-41 38 558 C2, a wheel is known which has a wheel spider which comprises several spokes and is connected with a rim ring by means of a welding. The wheel spider comprises hollow spokes and is fixedly connected with the rim ring by means of a friction weld. For this purpose, the wheel spider has, on the interior side, at least two plane surfaces extending around as weld rings. These weld rings are arranged corresponding to other opposite plane weld rings of the rim ring. The weld rings are arranged on different diameters.

Furthermore, in the above-mentioned application Ser. No. 08/008,582, and in German Patent Document DE-42 01 838 A1, a further development of the known wheel is described which has one rib respectively inside the hollow spoke.

It is an object of the invention to provide a wheel comprising a cast wheel spider having hollow ribs which, in addition to a low weight, has an optimal stability and permits an easy removal of the sand core after a casting.

According to the invention, this object is achieved by providing a wheel of the above-noted type, wherein the wheel spider has wheel bolt accommodating bores which are arranged concentrically to a centric wheel opening and which are provided with bore sleeves which are cast approximately in a center inside a respective hollow spoke, wherein radially extending reinforcing ribs extend from said bore, and wherein the wheel spider has at least one reinforcing element between the opposite walls of each hollow spoke in the area of the core openings.

By means of the invention, a cast wheel spider is advantageously provided which comprises hollow spokes with reinforcements and which, on the one hand, meets maximal stability requirements and, on the other hand, ensures a fast and simple removal of the sand core from the hollow spokes after a casting.

The construction of the hollow spokes with ribs cast onto the bolt hole sleeves (cups) of the wheel and of reinforcing elements in the form of cylindrical pins provided in the hollow spokes in a defined local arrangement or of pins of different geometrical cross-sectional shapes results in such spaces with respect to the lateral walls and the faces of the hollow spoke that the sand core can fall out or be blown out or be removed in another manner without difficulty.

Two or more cylindrical pins are arranged in the area of the internal core openings of the hollow spokes in certain preferred embodiments. They extend preferably in parallel to the wheel axis and have a distance from one another. Preferably, an arrangement of the pins is provided on both sides of a transverse plane of the wheel extending through the reinforcing rib. It is also contemplated to arrange only one pin in the transverse plane of the wheel. These pins are arranged radially approximately on the same diameter as the interior weld ring.

For a lighter construction of the wheel, the reinforcing ribs as well as the bolt hole sleeves have a relatively small wall thickness and an approximately identical overall thickness. Likewise, the pins have a small diameter so that sufficient space remains for an easy removal of the core sand.

Other objects, advantages and novel features of the present invention will become apparent from the following detailed description of the invention when considered in conjunction with the accompanying drawings.

DETAILED DESCRIPTION OF THE DRAWINGS

Figure 1:
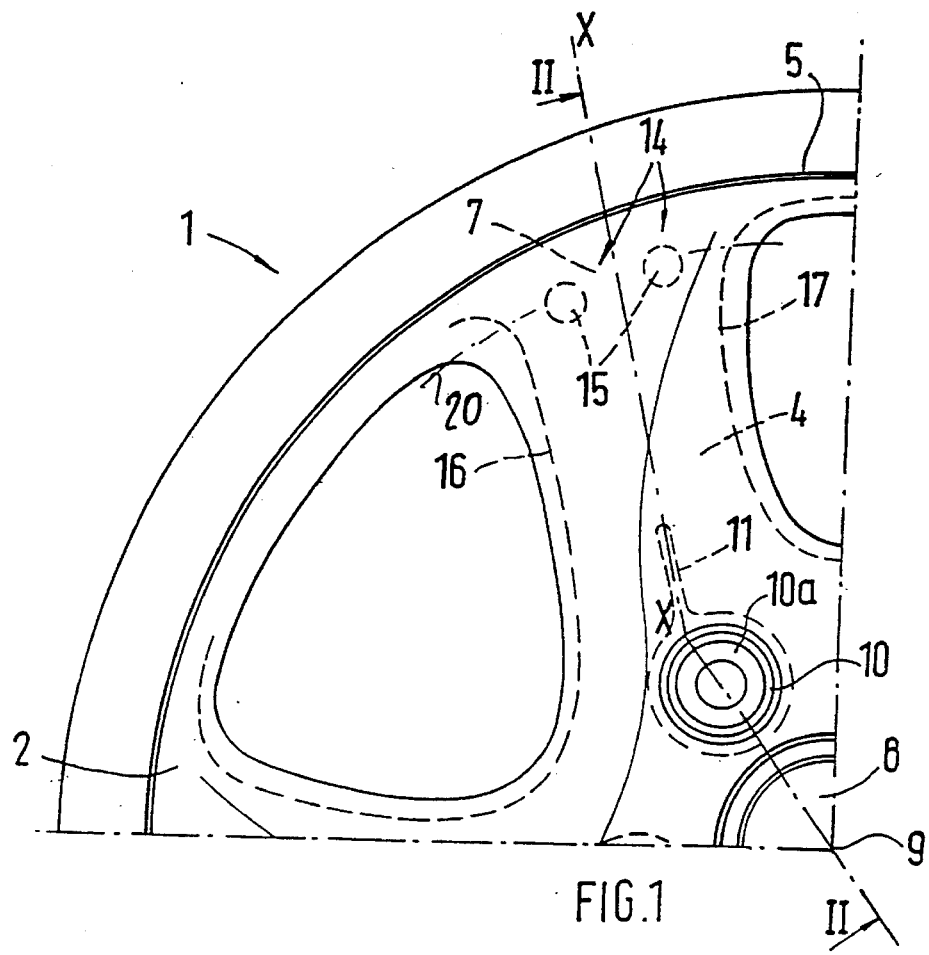
FIG. 1 is a partial frontal view of a wheel consisting of a wheel spider with a connected rim ring, constructed according to a preferred embodiment of the invention.
Figure 2:
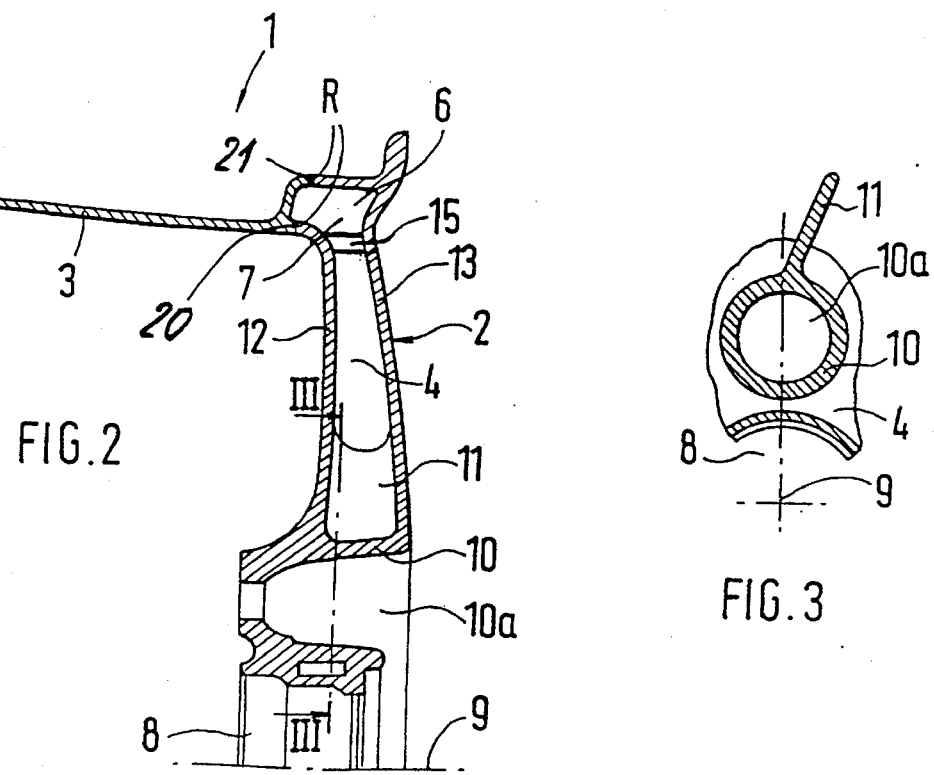
FIG. 2 is a sectional view taken along line II—II of FIG. 1 of a hollow spoke with the reinforcing rib and cylindrical reinforcing pins.
Figure 3:
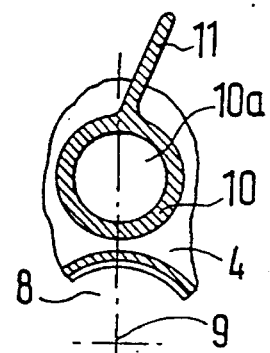
FIG. 3 is a sectional view taken along Line III—III of FIG. 2 of the bolt hole sleeve with a molded-on reinforcing rib.

The wheel 1 essentially comprises a wheel spider 2 with which a rim ring 3 is connected by way of a weld, particularly a friction weld R. The spokes 4 of the wheel spider 2 have a hollow construction and have a core opening 7 in the direction of the outer edge 5 which core opening 7 leads into a ring duct 6.

A wheel mounting bolt hole sleeve 10 is cast into the spoke 4 concentrically with respect to the centric wheel opening 8 with the wheel axis 9, a radially extending rib 11 adjoining this bolt hole sleeve 10. This reinforcing rib 11 is arranged in a transverse wheel plane X—X and supports the two opposite facial wall surfaces 12 and 13 of the hollow spoke 4 with respect to one another.

On the outlet side of the hollow spoke 5 in the mouth opening 7, reinforcing elements 14 are arranged in the form of cylindrical pins 15 or the like. These pins 15 extend in parallel to the wheel axis 9 and are cast in one piece with the facing wall surfaces 12 and 13 of the hollow spoke 1.

The pins 15 are preferably arranged on both sides of a transverse wheel center plane X—X extending through the rib 11 so that they have a distance from one another and have another distance to the lateral walls 16, 17.

The bolt hole sleeve as well as the rib have thin-walled constructions and have an approximately identical wall thickness. The cylindrical pins are provided with the smallest possible diameter so that the sand core can be removed from the opening.

The pins 15 are arranged approximately on the diameter of the interior weld ring 20 of the friction weld R which is supplemented by a weld ring 21 having a larger diameter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Wheel having a cast wheel spider comprising several hollow spokes connected with a rim ring by a weld, the hollow spokes having core openings for a sand core in the area of the outer circumference which are directed toward the rim ring, each said hollow spoke being defined by opposing walls, wherein the wheel spider has wheel bolt accommodating bores which are arranged concentrically to a centric wheel opening and which are defined by bolt hole sleeves which extend through respective hollow spokes, wherein at least one reinforcing rib and at least one reinforcing element are arranged within said hollow spokes, wherein said at least one reinforcing rib extends from a respective said bolt hole sleeve, and wherein said at least one reinforcing element extends between the opposing walls of a respective hollow spoke in the area of the core openings.

2. Wheel according to claim 1, wherein the at least one reinforcing element comprises two cylindrical pins respectively which extend in parallel to the wheel axis and are arranged at a distance from one another and are situated on opposite sides of a transverse wheel plane defined by a respective associated reinforcing rib.

3. Wheel according to claim 2, wherein said opposing walls include opposing lateral walls which are spaced in a circumferential direction, and wherein a spacing is provided between the pins and the opposing lateral walls.

4. Wheel according to claim 1, wherein a wall thickness of the reinforcing ribs and the bolt hole sleeves is the same and the ribs extend approximately along ⅓ of the length of the hollow spokes.

5. Wheel according to claim 1, wherein the weld includes a pair of concentric weld rings and wherein the reinforcing element is arranged approximately on the diameter of an interior weld ring.

6. Wheel according to claim 2, wherein a wall thickness of the reinforcing ribs and the bolt hole sleeves is the same and the ribs extend approximately along ⅓ of the length of the hollow spokes.

7. Wheel according to claim 3, wherein a wall thickness of the reinforcing ribs and the bolt hole sleeves is the same and the ribs extend approximately along ⅓ of the length of the hollow spokes.

8. Wheel according to claim 2, wherein the weld includes a pair or concentric weld rings and wherein the pins are arranged approximately on the diameter of an interior weld ring.

9. Wheel according to claim 3, wherein the weld includes a pair of concentric weld rings and wherein the reinforcing element is arranged approximately on the diameter of an interior weld ring.

10. Wheel according to claim 4, wherein the weld includes a pair of concentric weld rings and wherein the reinforcing element is arranged approximately on the diameter of an interior weld ring.

11. Wheel according to claim 1, wherein the at least one reinforcing element includes a cast pin which extends in parallel to the wheel axis.

12. Wheel according to claim 10, wherein the weld has an interior weld ring, and wherein the cast pin is located radially inward of and adjacent to the interior weld ring and radially outward of the associated bolt hole sleeve.

13. Wheel according to claim 1, wherein said opposing walls extend in a generally radial direction from said centric wheel opening and include opposing facial walls which are spaced in an axial direction, and wherein the at least one reinforcing element extends between the opposing facial walls.

14. Wheel according to claim 1, wherein said opposing walls extend in a generally radial direction from said centric wheel opening and include opposing facial walls which are spaced in an axial direction, and wherein the at least one reinforcing rib extends in said generally radial direction and extends between the opposing facial walls.

15. Wheel according to claim 13, wherein the at least one reinforcing rib extends in said generally radial direction and extends between the opposing facial walls.

16. Wheel according to claim 1, wherein the weld is a friction weld.

17. Wheel according to claim 16, wherein the friction weld includes a pair of concentric weld rings and wherein the reinforcing element is arranged approximately on the diameter of an interior weld ring.

18. Wheel according to claim 2, wherein the weld is a friction weld, and wherein the friction weld includes a pair or concentric weld rings and wherein the pins are arranged approximately on the diameter of an interior weld ring.

19. Wheel according to claim 4, wherein the weld is a friction weld, and wherein the friction weld includes a pair or concentric weld rings and wherein the reinforcing element is arranged approximately on the diameter of an interior weld ring.

20. Wheel according to claim 19, wherein the friction weld has an interior weld ring, and wherein the cast pin is located radially inward of and adjacent to the interior weld ring and radially outward of the associated bolt hole sleeve.

* * * * *